(No Model.) 2 Sheets—Sheet 2.
J. YOUNG.
STOCK RACK.
No. 340,966. Patented Apr. 27, 1886.
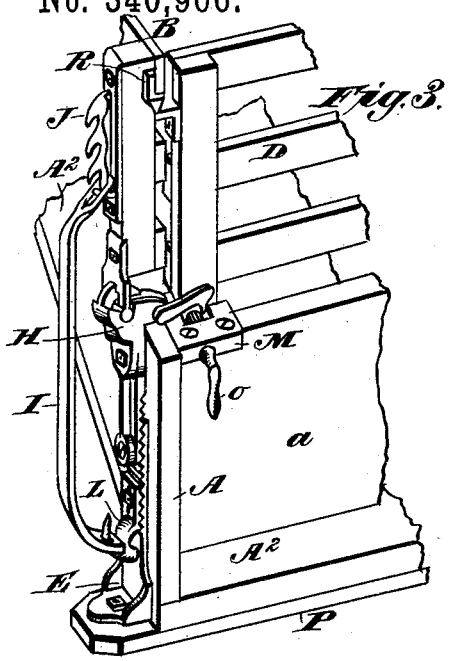
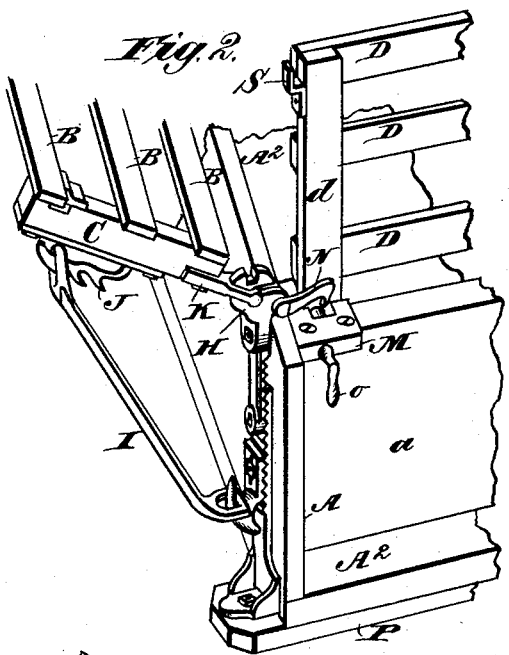
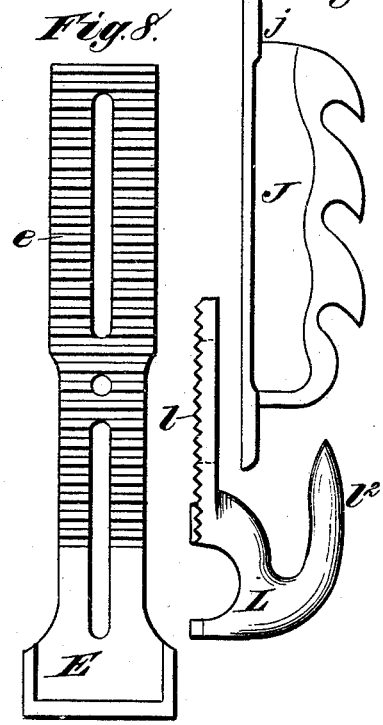
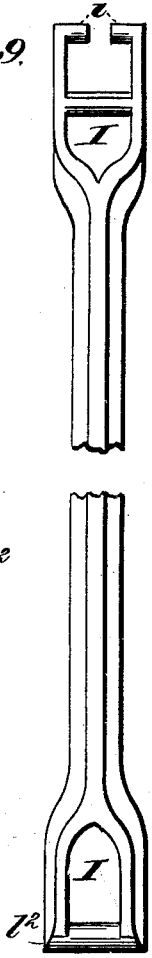
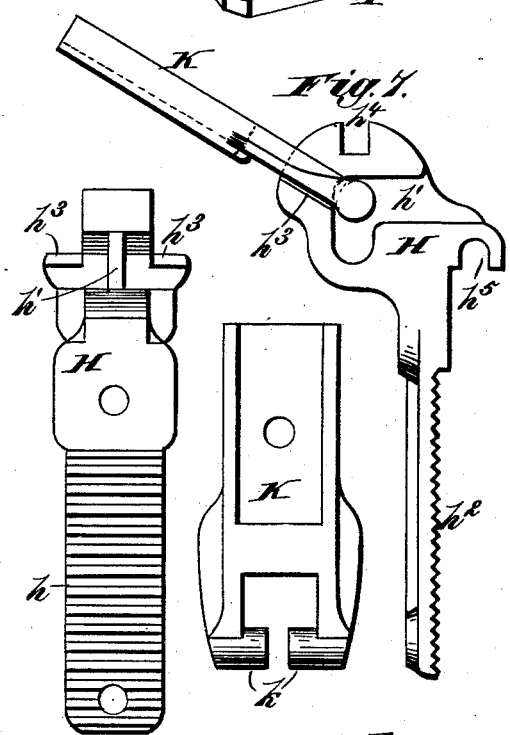
Witnesses.
Robert Emmett,
Percy B. Hills.
Inventor:
John Young.
By James L. Norris.
Atty.
N. PETERS. Photo-Lithographer, Washington, D. C.

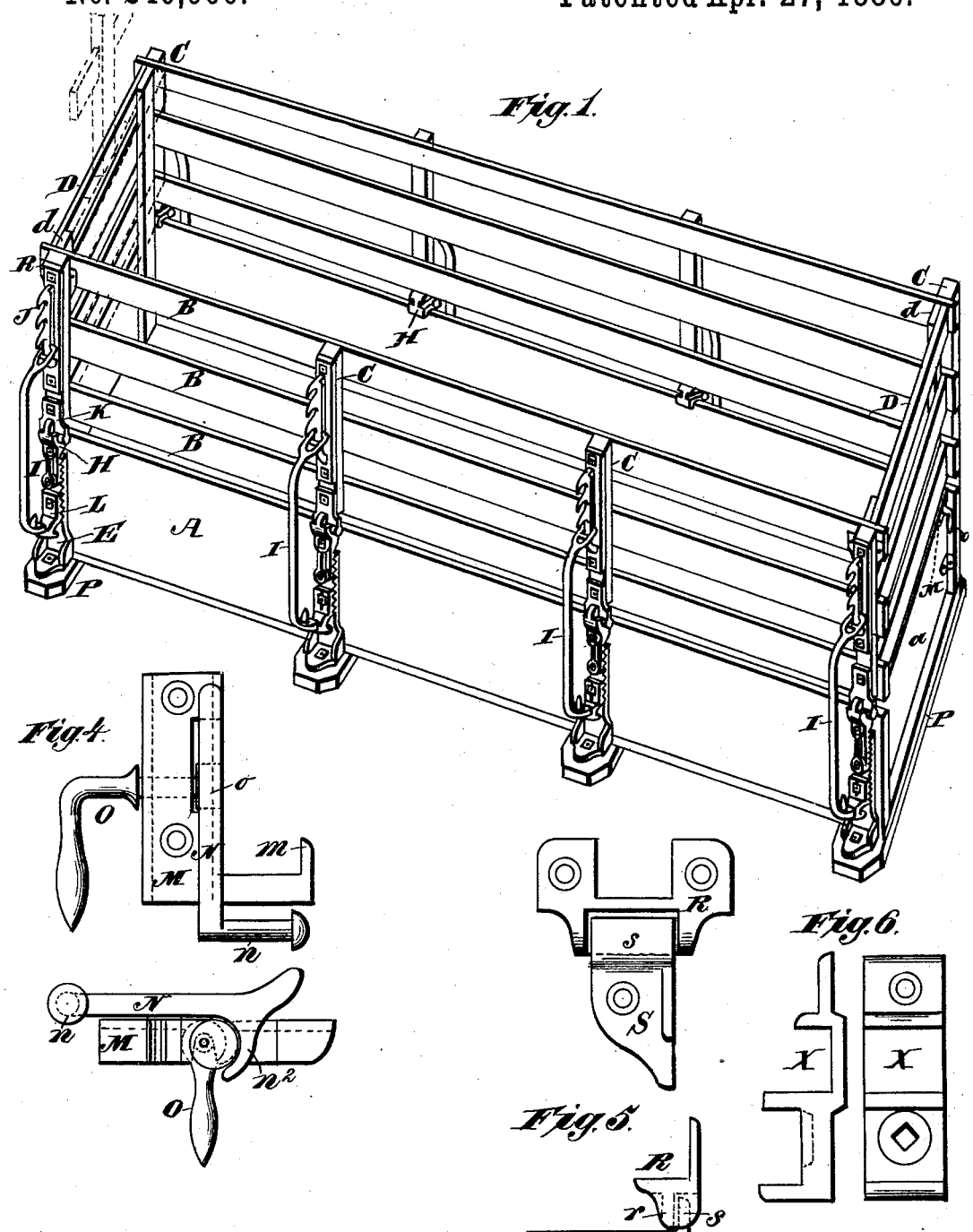

UNITED STATES PATENT OFFICE.

JOHN YOUNG, OF LITCHFIELD, MICHIGAN.

STOCK-RACK.

SPECIFICATION forming part of Letters Patent No. 340,966, dated April 27, 1886.

Application filed January 6, 1886. Serial No. 187,828. (No model.)

*To all whom it may concern:*

Be it known that I, JOHN YOUNG, a citizen of the United States, residing at Litchfield, in the county of Hillsdale and State of Michigan, have invented new and useful Improvements in Automatic Adjustable Stock - Racks, of which the following is a specification.

My invention relates to improvements in stock-racks, such as make them adjustable in their irons and mountings for large and small beds and light and heavy work, and in their style and construction convertible into a close box like a wagon-bed, with a rack extending above it convenient for hauling live stock, or by extending the rack above the bed outward be convenient for hauling bulky produce or other merchandise, or by extending the rack part much more it is converted into a rack or ladder for hauling hay, straw, cornstalks, &c.; or the upper rack part may be quickly taken off and I have a strong and durable wagon box or bed.

The object of my invention is to produce a device that can be easily changed or converted into a suitable shape to be convenient for these various uses, and at the same time be simple, strong, and durable in its construction, adjustable in its parts for convenience in fitting, and automatic in its movements, thus supplying a long-felt want. I attain these objects by the mechanism illustrated in the accompanying drawings, in which—

Figure 1 is a perspective view of my rack complete as arranged for hauling live stock. Fig. 2 is an enlarged view representing one corner of the bed with the rack on it extended, as when used for hauling hay, straw, &c., the wood parts being represented as broken away. Fig. 3 is an enlarged view representing one corner of the bed and rack with the wood parts broken away and the rack parts closed up and locked together at the top. Fig. 4 is a one-half-size detail view of the three parts forming the end-gate lock, shown in two ways. Fig. 5 is a one-half-size detail view of the two parts forming the lock for each corner of the rack at the top, shown in two ways. Fig. 6 is a one-half-size detail view of the end-gate stay or clip, and the clip also for the end posts, shown in two ways. Fig. 7 is a one-half-size detail view of the head and arm forming the joint, shown in two ways, with its adjustments and attachments. Fig. 8 is a one-half-size detail view of the side hold-up bracket. Fig. 9 is a one-half-size detail view of the brace and the adjustable hook and the rack that work in connection with it, in all of which views like letters refer to like parts.

The rack is constructed of wood and malleable-iron castings. The wood parts consist of the side-boards, end-gates, bottom, cleats, rail parts, arms, line post, &c., to which the various parts of malleable iron are screwed and bolted, as hereinafter shown and described.

A A represent the sides of a wagon-bed, and *a a* represent the back and front end-gates, and A² the bottom, and P P P P are the bottom battens. These parts are arranged as they are in the ordinary wagon-bed, and may be of any desired width.

To the projecting end of each batten P is bolted a hold-up bracket-iron, E, arranged with serrations on the face of it, *e*, for adjustment, which are adapted to engage with similar serrations, *l*, on the adjustable hook L, and also serrations $h^2$ on the arm lock-head H, the three parts being clamped together and onto the side of the bed A by means of bolts and screws, thus being made adjustable to suit different widths of sides A and different positions for the brace I. In this head H is pivoted an arm lock-plate, K, arranged so as to admit of several adjustments, and also of being taken out easily. To this plate K is bolted an arm, C, to which is bolted two or more slats, B B B, and a rack-plate, J, which engages with the upper end of the brace I. The upper end of the brace I is arranged with an opening, *i*, which allows the brace to pass over the web of the rack-plate J, passing in above at the point *j*. Thus the brace hangs on the rack-plate when at rest, and may be easily taken out. These slats B B B are designed to extend the whole length of the sides A A of the bed, and are secured to two or more arms, C, each of which is arranged with the lock-plate K, head H, bracket E, hook L, rack-plate J, and brace I, as described, the other side of the bed being arranged in the same manner. These movable adjustable sides, composed of the slats B B B and arms C, may be arranged as shown in Fig.

2, or adjusted in the several notches of the rack-plate J, or be elevated into the position shown in Fig. 3. When in this position, the arm lock-plate K drops into the notch $h^4$ in the head H, while at the same time the plates R and S at the top interlock, the plate R being secured to the top slat, B, and arm C, and the plate S is secured to the post $d$, which forms a part of the rack for the end above the end-gate $a$, the cross-slats D D D being secured to two of these posts $d$—one on each side. The front and back end-gates, $a\ a$, are secured below by a stay or clip, X, Fig. 6, which holds also the post $d$. Near its lower end, M, is a plate secured to the top edge of the end-gate $a$ by means of screws, in which is pivoted a shaft with a lever, O, on one end and an eccentric, $o$, on the other. N is a hook which engages with the eccentric O, one end of which is pivoted to the head H in the opening $h^5$. These form an end-gate lock, and the angular arm $m$ holds the post $d$. These parts are provided in rights and lefts, each corner of the bed being provided with one; but the intermediate ones on each side are used without the clip X and the three parts M, N, and O, which form the end-gate lock, as described.

By arranging double slats D D at the top and bottom on one end I provide for a line-post, Y, (shown in dotted lines,) to slip down between them and extend up as high as necessary, to be used when hauling hay, straw, or other bulky material when the sides are extended.

The various parts of my wagon-bed and stock and hay rack combined are secured together by means of bolts and screws. The arm lock-plate K has an opening, $k$, in it where it strides the web $h'$ of the head H. By this means it may be raised up and taken out by moving it toward the center of the bed. The sides are easily raised up and adjusted from notch to notch, or lowered from notch to notch, as desired. The ends and sides of the rack may be quickly and easily taken off, leaving nothing but the heads H H, &c., and hooks L L, &c., and hold-up irons E E, &c., and the end-gate or corner lock-irons, M, N, and O on the bed.

The manner in which the arm lock-plate K is pivoted in the head H, and the manner in which the brace I is arranged to work in connection with the adjustable hook L and the rack-plate J, gives an automatic movement to these parts and allows the whole side to be raised and lowered at once without locking or binding, and in the same manner a whole side may be taken off or put on at the same time, the lower ends of the braces naturally dropping into their places on the hooks L L, &c.

Having thus described the construction, the working, and the uses and advantages of my invention so that any one skilled in the arts can make and operate the same, what I claim as new, and desire to secure by Letters Patent, is—

1. In an adjustable stock-rack, the combination, with the sides A A, ends $a\ a$, bottom $A^2$, and battens P P, of the bracket-irons E E, secured to sides A A and having serrations $e$, the arm lock-heads H H, and the adjustable hooks L L, substantially as described.

2. In an adjustable stock rack, the combination, with the sides A A, ends $a\ a$, bottom $A^2$, and battens P P, of the bracket-irons E E, the arm lock-heads H H, hooks L L, arm lock-plates K K, rack-plates J J, braces I I, arms C C, and slats B B, substantially as described.

3. The combination, with the arms C C and lock-heads H H, of the plates M, secured to the end-gates $a\ a$, the eccentrics $o\ o$, pivoted in said plates, the levers O O, connected with said eccentrics, and the hooks N N, pivoted to the lock-heads H H, substantially as described.

4. The combination, with the swinging side slats, B B, connected together by the arms C C, and the end slats, D D, connected together by the posts $d\ d$, of the lock-plates R and S, substantially as described.

In testimony whereof I have hereunto set my hand in the presence of two subscribing witnesses.

JOHN YOUNG.

Witnesses:
    JOSEPH N. CLOUSE,
    WILLIAM H. TUCKER.